Oct. 25, 1955    M. A. ORDORICA ET AL    2,721,636
WINDOW PANEL MOUNTING AND LOCKING MEANS
Filed Feb. 10, 1950    3 Sheets-Sheet 1
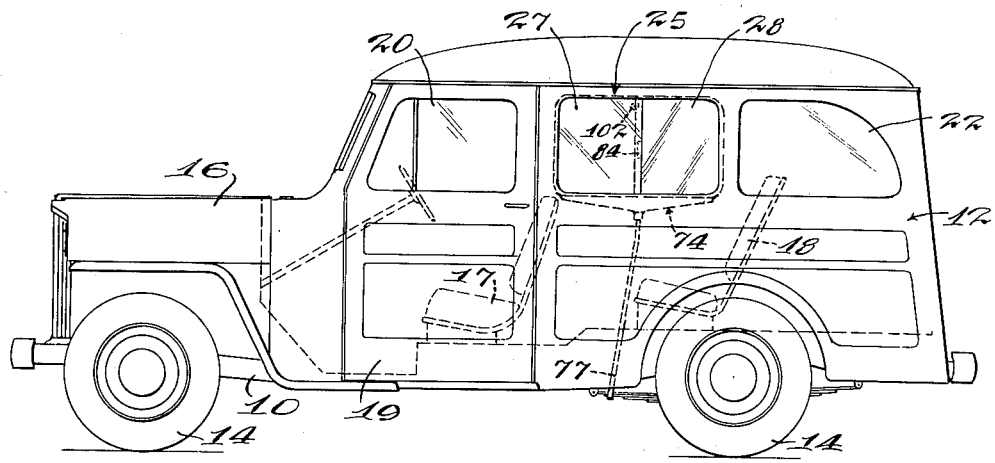
FIG-1-
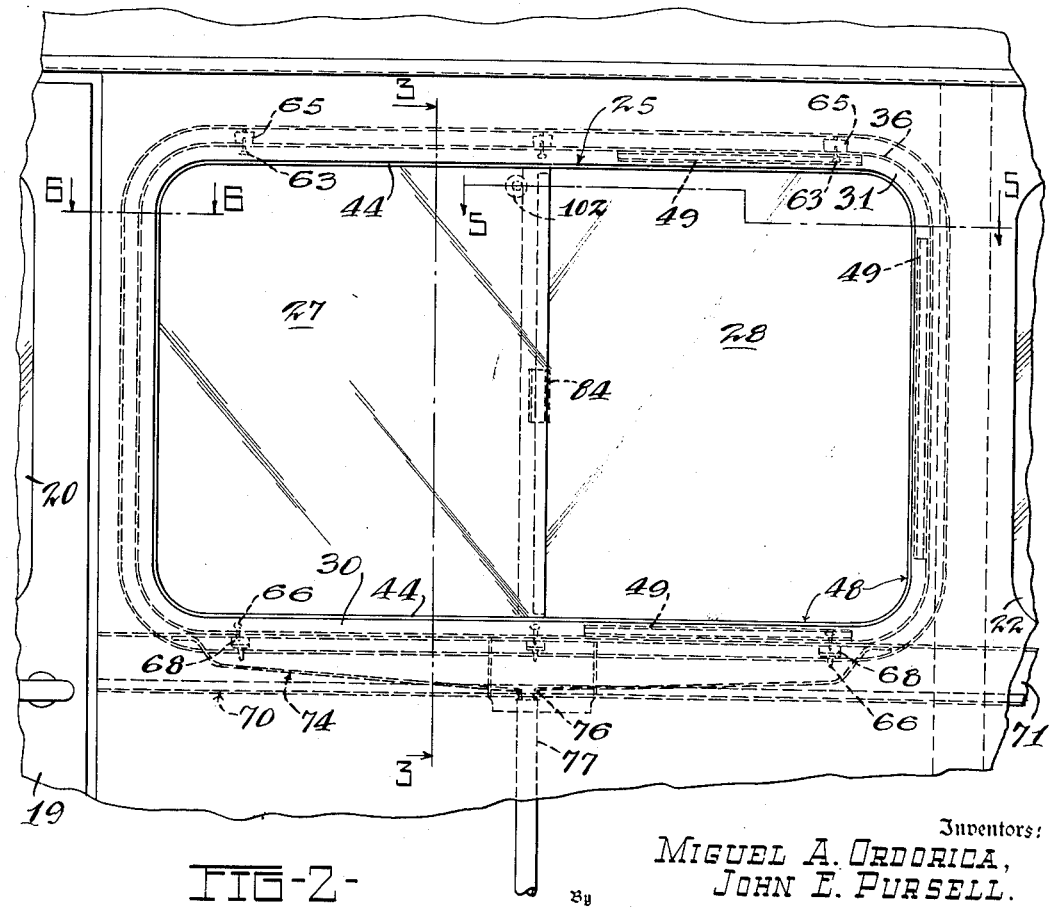
FIG-2-
Inventors:
MIGUEL A. ORDORICA,
JOHN E. PURSELL.
By Harry O. Ernsberger
Attorney Oct. 25, 1955     M. A. ORDORICA ET AL     2,721,636
WINDOW PANEL MOUNTING AND LOCKING MEANS
Filed Feb. 10, 1950     3 Sheets-Sheet 2
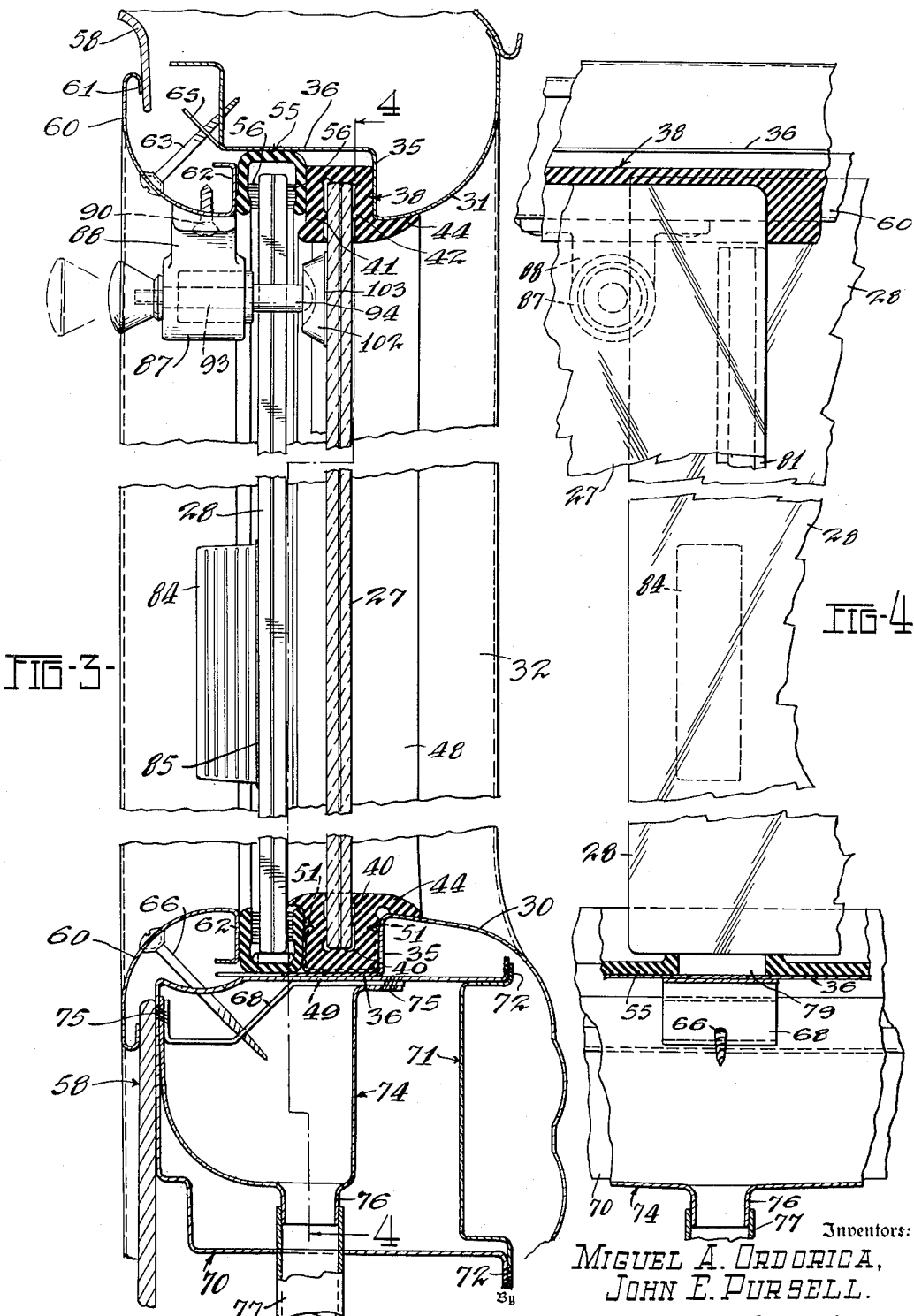
Inventors:
MIGUEL A. ORDORICA,
JOHN E. PURSELL.
Harry O. Ernsberger
Attorney Oct. 25, 1955  M. A. ORDORICA ET AL  2,721,636
WINDOW PANEL MOUNTING AND LOCKING MEANS
Filed Feb. 10, 1950  3 Sheets-Sheet 3
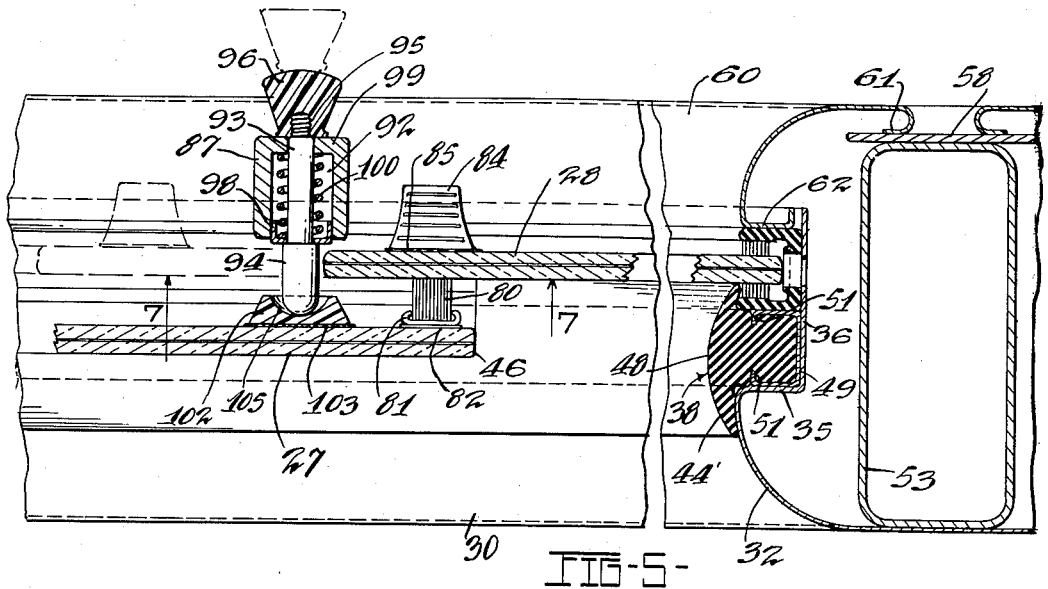
FIG-5-
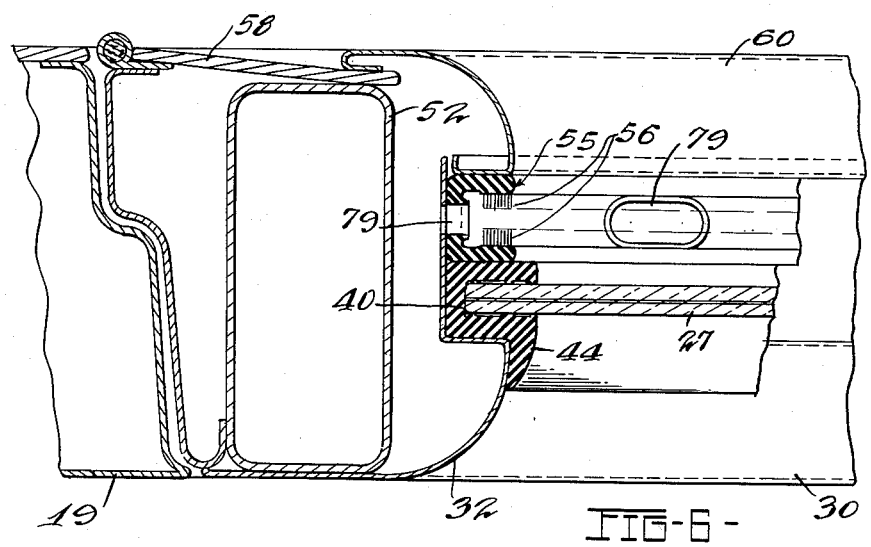
FIG-6-
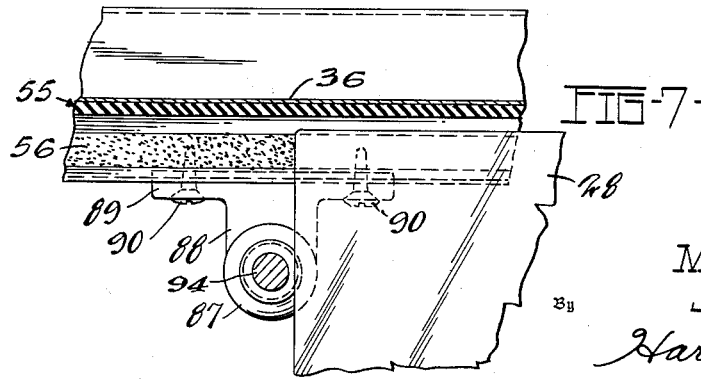
FIG-7-
Inventors
MIGUEL A. ORDORICA,
JOHN E. PURSELL.
By Harry O. Ernsberger
Attorney United States Patent Office 2,721,636
Patented Oct. 25, 1955

2,721,636
WINDOW PANEL MOUNTING AND LOCKING MEANS

Miguel A. Ordorica and John E. Pursell, Toledo, Ohio, assignors, by mesne assignments, to Bank of America National Trust and Savings Association, a national banking association Application February 10, 1950, Serial No. 143,514

3 Claims. (Cl. 189—64)

This invention relates to glazed window mounting and weather strip and locking means therefor and more especially to constructions including a slidable glazed window arrangement.

The invention more especially relates to the mounting of cooperating relatively stationary and slidable glazed window panels of a character particularly usable in vehicle constructions and embraces a novel mounting means therefor whereby an effective weather seal is provided for the window panels.

The invention has for an object the provision of a weather seal arrangement for vehicle windows wherein a single sealing element is provided for establishing an effective seal for both stationary and slidable window panels or panes.

Another object of the invention resides in the provision of a novel mounting and locking means for a slidable window pane which is theft proof and cannot be opened except through the positive movement of an abutment or locking means.

The invention further includes a recessed element permanently affixed to a glass panel and engaged by a locking bolt or abutment in a manner that prevents relative opening movement of the window and which may not be manipulated by tools in the hands of surreptitious persons.

Another object of the invention resides in a simple yet effective mounting and weather seal means for glass panels or windows of vehicles wherein relatively stationary and slidable panels are disposed in juxtaposed relationship.

Another object of the invention resides in a mounting means for vehicle window panels in combination with an effective drain for carrying away rain water that may collect on the window panels.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

Figure 1 is a side elevational view of a vehicle embodying a form of the invention;

Figure 2 is an enlarged elevational view of the window construction and mounting and locking means therefor;

Figure 3 is a vertical sectional view taken substantially on the line 3—3 of Figure 2;

Figure 4 is a fragmentary vertical sectional view taken substantially on the line 4—4 of Figure 3;

Figure 5 is an enlarged horizontal detail sectional view taken substantially on the line 5—5 of Figure 2;

Figure 6 is a detail sectional view taken on the line 6—6 of Figure 2;

Figure 7 is a detail view taken substantially on the line 7—7 of Figure 5.

While there is illustrated a preferred form of my invention as utilized in the mounting and locking construction of relatively stationary and slidable windows of an automotive vehicle, it is to be understood that the arrangement of the invention is suspectible of use with various types of window installations.

Referring to the drawings in detail and first with respect to Figure 1, there is illustrated a form of automotive vehicle embodying the relatively stationary and slidable window panels and mounting arrangement of the invention. The vehicle is inclusive of a chassis frame 10 upon which is mounted a closed type body construction 12, the vehicle being supported upon pairs of road wheels 14. The vehicle is powered by an engine (not shown) enclosed within a bonnet or hood 16.

The body construction illustrated is of the so-called station wagon type which is inclusive of front and rear seats designated 17 and 18 respectively. A door 19 is arranged at each side of the vehicle for entrance to the body interior. The door 19 is provided with a glazed window 20 which may be raised or lowered by means not shown. The rear side portions of the body 12 are provided with glazed panels 22 which are sealed in the body in relatively immovable condition.

The body 12 is formed at each side with suitable window openings 25 within which are fitted glazed window panels equipped with lock constructions and panel mounting means of the invention.

The details of the arrangement of the invention are best shown in Figures 2 through 7 inclusive and further reference is directed to these figures. The window arrangement is inclusive of a relatively stationary glazed panel 27 and relatively slidable glazed panel 28.

The window opening 25 is of substantially rectangular configuration formed in the body panel and is bounded by inwardly extending flange portions 30 and 31 at the top and bottom respectively and at the ends by inwardly extending vertically disposed flange portions 32. The flange portions 30, 31 and 32 are bent outwardly as at 35 and thence laterally as at 36 to form a recess adapted to receive and accommodate a generally rectangular shaped weather strip or weather seal member 38 formed of rubber or other similar weather resistant material. As particularly illustrated in Figure 3, the portion of the weather strip 38 adjacent the stationary glazed panel 27 is configurated in a manner to provide an effective support and seal for the stationary window. As illustrated in this figure, the weather strip 38 is formed or molded with a groove 40 adapted to engage three sides of the stationary glazed panel 27. The rubber weather strip 38 is molded in a manner so that the portions 41 and 42 forming the sides of the channel-shaped recess are in close frictional sealing engagement with the surfaces of the stationary glazed panel 27. The weather strip 38 is also molded or formed with a suitable projecting lip portion 44 which snugly engages portions of the projections 30, 31 and 32 to form a weather-tight seal therewith. The recess or groove 40 in the weather strip 38 terminates at the rear edge 46 of the panel 27 and the portion of the weather strip 38 bounding the remaining area of the window opening 25 in the vertical plane of the glazed panel 27 is ungrooved in cross sectional configuration as shown in Figure 5 presenting a smooth surface 48. The weather strip 38 is provided with metal reinforcement members 49 of channel-shaped configuration which are disposed in three sides of the strip, viz. the top and bottom portions and the rear vertical portion as shown in Figures 2, 3 and 5. The side walls of the channel shaped reinforcing members 49 are provided with terminal portions 51 which are bent inwardly into suitable grooves formed in the weather strip and to hold the same in place in the window opening 25. The channel members 49 fit snugly within the laterally extending recesses of the body panel formed by portions 35 and 36 bounding the window opening.

The reinforcing metal channel members 49 for the rubber weatherstrip or sealing member 38 are three in number and are arranged as shown in Figure 2 at the top and bottom and rear pillar formation. Through the use of members 49 that portion of the weather strip 38 which has no window receiving groove or recess is securely positioned in the metal recess formed by portions 35 and 36 of the body panel so that no dislodgement of the weather strip 38 can occur.

A second glazed panel 28 is disposed in the window opening 25 and is arranged for slidable movement to closed and open positions in a plane lying parallel with the plane of the stationary panel 27 as shown in Figures 3 and 5. The movable panel 28 is disposed in a suitable guiding means which as illustrated is inclusive of a channel member 55 which completely surrounds the window opening 25 and is disposed adjacent to and coextensive with the weather strip 28. The channel member or guide 55 for the movable window panel 28 is preferably lined interiorly with a layer of felt 56 which contacts the obverse and rear surfaces of the glazed panel 28 so as to form a resilient guiding and supporting means therefor which will not be affected by temperature changes and adverse weather conditions so that the panel 28 may at all times be readily moved to open and closed positions. The panel 28 is adapted for sliding movement in a direction longitudinally of the vehicle in the guiding member or channel 55.

The interior of the vehicle body is provided with a trim panel construction 58. A molding strip or escutcheon member 60 is arranged to secure the window guiding means 55 in position and to provide a neat appearance for the body interior adjacent the window opening. The molding strip 60 is provided with a portion 61 adapted to engage the body trim panel 58 and is formed with a flange 62 adapted to engage and coincide with the interior outermost wall of the window guide member 55 as particularly shown in Figures 3 and 5. The strip 60 is held in position by means of screws 63 which are threaded into openings formed in lips 65 which are struck up from the portion 36 of the exterior body panel extending across the top of the window opening. The portion of the strip 60 at the lower portion of the window opening is secured in place by means of screws 66 extending into openings threaded in spaced clips 68.

The construction adjacent the lower horizontal portion of the window guiding means 55 and weather strip 38 is formed with a suitable moisture or water collecting and discharging means. The body construction of the vehicle is provided with a horizontally disposed inner frame member 70 and a belt rail reinforcement member 71 which are secured together at spaced intervals by spot welding as indicated at 72. Disposed within the zone bounded by the members 70 and 71 is a longitudinally extending trough-like member 74 having longitudinally extending portions spot welded to the frame member 70 and clips 68 as indicated at 75. The trough-like member or drain 74 is provided intermediate its ends with a tubular discharge outlet 76 which is telescoped with a tube or pipe 77 extending downwardly between the exterior and interior body panels to a point of discharge beneath the vehicle as illustrated in dotted lines in Figure 1.

The bottom wall portions of the drain trough 74 are preferably canted or slanted downwardly toward the drain outlet 76 so as to provide the necessary inclination or "fall" so that water or moisture collecting upon or adjacent the window panels will be conveyed to and discharged through the drain pipe 77.

The lower horizontal portion of the movable panel guiding means 55 is provided with a plurality of longitudinally spaced elongated slots 79 as shown in Figures 4 and 6 to facilitate the passage of water collecting in the channel 55 to flow through the slots into the drain trough 74.

The body construction adjacent the ends of the window opening is provided with vertically disposed hollow pillar posts 52 and 53 shown in Figures 5 and 6 and serve as a reinforcement for that portion of the body adjacent the window opening.

As will be seen in Figures 3 and 5, the window panels 27 and 28 are arranged in laterally spaced panels so that the panel 28 is slidable past the stationary panel 27. Means are provided for effecting a weather resistant seal between the stationary and movable window panels which will not interfere with the slidable movement of the panel 28. As particularly shown in Figure 5 a strip of felt 80 carried by a suitable backing member 81 or stiff material is bonded to the stationary glass panel 27 by a suitable thermo-fusible bonding agent or weather resistant adhesive 82, the felt strip 80 being arranged in a vertical position between the glass panels. The projecting fibers of the felt strip 80 are in contact at all times with the outer surface of the movable glass panel 28, the strip providing a barrier to prevent passage of rain and snow into the space between the window panels. The felt strip 80 and the felted guides 56 are resilient and hence at all times engage the surfaces of the panel 28 to form a weather resistant structure.

A suitable handle is associated with the slidable glass panel 28 in order to facilitate the manipulation of the window. In the embodiment illustrated the handle 84 is preferably formed of a resinous plastic material such as melamine formaldehyde which is suitably bonded to the surface of the glass panel by means of a fusible bonding media indicated at 85. A suitable bonding material that has been found satisfactory for this purpose is composed of phenolic resin and buna N resins and may be fused through the application of high frequency current oscillations.

The invention is inclusive of an effective latch or locking means to prevent or impede slidable movement of the glass panel from the exterior of the vehicle body when the movable panel is in fully closed position as shown in Figure 5. The locking means of the vehicle is inclusive of a housing 87 formed with an upwardly extending portion 88, the latter being provided with projecting flanges 89 which are bored to accommodate screws 90 adapted to be threaded into suitable openings in the upper horizontal portion of the molding strip or escutcheon 60. The screws 90 may be of the so-called sheet metal type although any suitable securing means may be employed. The housing 87 is formed with a cylindrical interior chamber 92 within which is disposed a plunger 93 equipped with a projecting portion or lock bolt 94 movable in a direction normal to the plane of the glazed panel 27. The other end of plunger 93 is provided with a threaded tenon 95 upon which is mounted a manipulating knob or button 96 formed of plastic or other suitable material. The button 96 may be molded on the threaded portion 95 or may be bored and threaded to accommodate the tenon 95. Surrounding the rod 93 and adjacent the bolt portion 94 is a cup-shaped washer or member 98, the cylindrical wall of the cup-shaped configuration slidably fitting the interior cylindrical wall of the chamber 92. Surrounding the rod 93 and disposed between an end wall 99 of the housing 87 and the cup-shaped member 98 is an expansive coil spring 100 which serves at all times to resiliently urge the lock bolt 94 toward the stationary glass panel 27 and in the path of movement of the slidable panel 28, this position of the bolt being illustrated in Figure 5. A keeper member 102 which is bonded by means of a suitable thermo-fusible material 103 to the inside surface of the stationary panel 27 forms a means cooperating with the lock bolt 94 to prevent slidable movement of the panel 28. The keeper member 102 disposed between the glass panels is of a height which will not interfere with the panel 28 sliding past the member 102. The keeper member 102 is provided with a socket or recess 105 adapted to receive the end portion of the lock bolt 94, the spring 100 serving to urge the bolt into the socket 105 as illustrated in Figure 5. The locking means above described is effective as it will thwart any attempts by a surreptitious person to insert an instrument or tool between the end of the bolt 94 and the keeper member 102 from the exterior of the vehicle thus rendering it impossible to manipulate and release the lock bolt 94 from engagement with the keeper except by manipulation of the knob 96 from the interior of the vehicle.

When it is desired to release the locking means so as to slide the glass panel 28 to an open position, the knob 96 is grasped and force exerted longitudinally of the rod 93 in a direction to withdraw the lock bolt 94 from engagement in the socket 105 of the keeper member 102. The bolt 94 is thus withdrawn into the interior chamber 92 in the housing 87 to a position where the panel 28 may pass the bolt. After the lock bolt is withdrawn to the above mentioned position the vehicle operator may, by grasping the handle 84, slide the window 28 past the lock bolt and adjust the window to any desired position. After the window panel is moved away from completely closed position and the operator releases the knob 96, the spring 100 thereafter resiliently urges the lock bolt into engagement with the interior surface of the window 28, the bolt riding upon the surface of the glass panel 28 during slidable adjustments of the panel. The pressure of spring 100 is not sufficient to materially increase the force required applied to handle 84 to facilitate slidable movement of the panel 28. When the panel 28 is moved to closed position as shown in Figure 5, the lock bolt 94 under the expansive force of the spring 100 immediately passes the forward edge of the glass panel 28 and is automatically and resiliently seated in the socket 105 formed in the keeper 102. Through the use of the window locking means hereinabove described, manual movement of the knob 96 and lock bolt 94 is required only when it is desired to move the panel 28 away from a fully closed position. Thereafter during subsequent movements of the panel 28 no manipulation of the knob 96 is necessary and when the panel 28 is moved to fully closed position the bolt 94 is automatically moved to latching position in the path of the movable panel 28.

It is apparent that, within the scope of the invention, modifications and different arrangements may be made other than is herein disclosed, and the present disclosure is illustrative merely, the invention comprehending all variations thereof.

What we claim is:

1. Window construction and mounting means including a stationary panel arranged to be secured in a window opening and occupy a portion of the window area; a second panel slidably movable in a direction parallel to said first mentioned panel and occupying the remaining portion of the window area when in closed position; a weather strip formed of yieldable material completely surrounding and defining the window area; said weather strip being formed with a recess to receive and support the stationary panel and form therewith a weather-tight joint; a stationary channel-shaped guiding means coextensively arranged adjacent said weather strip and directly engaging the surfaces of and forming a run for guiding said movable panel; a metal escutcheon surrounding said window opening and coextensively disposed adjacent the movable window guiding means; movable abutment means normally projecting into the path of movement of the slidable panel for retaining the latter in closed position; said abutment means being supported by and depending from said escutcheon; said abutment means being manually movable to a position out of the path of movement of the slidable panel whereby the latter may be moved to full open or intermediate positions, said abutment means engaging a surface of the slidable panel when the latter is moved from closed position.

2. Window construction and mounting means including a stationary panel arranged to be secured in a window opening and occupy a portion of the window area, a second panel slidably movable in a direction parallel to said first mentioned panel and occupying the remaining portion of the window area when in closed position, a weather strip formed of yieldable material completely surrounding and defining the window area, that portion of said weather strip defining the window area occupied by said stationary panel being formed with a recess to receive and support said stationary panel and form therewith a weather tight joint, the remaining portion of said weather strip defining the remaining window area being solid in cross section and having reinforcing means secured thereto to prevent buckling of said remaining portion of said weather strip, a stationary channel shaped guiding means coextensively arranged adjacent said weather strip and directly engaging the surfaces of and forming a run for guiding said movable panel, a metal escutcheon surrounding said window opening and coextensively disposed adjacent the movable window guiding means, a keeper secured to said stationary panel, and a bolt member supported by said escutcheon cooperable with said keeper when said movable panel is in the closed position.

3. Window construction and mounting means including a stationary panel arranged to be secured in a window opening and occupy a portion of the window area, a second panel slidably movable in a direction parallel to said first mentioned panel and occupying the remaining portion of the window area when in closed position, a weather strip formed of yieldable material completely surrounding and defining the window area, that portion of said weather strip defining the window area occupied by said stationary panel being formed with a recess to receive and support said stationary panel and form therewith a weather tight joint, the remaining portion of said weather strip defining the remaining window area being solid in cross section and having reinforcing means secured thereto to prevent buckling of said remaining portion of said weather strip, a stationary channel shaped guiding means coextensively arranged adjacent said weather strip and directly engaging the surfaces of and forming a run for guiding said movable panel, a metal escutcheon surrounding said window opening and coextensively disposed adjacent the movable window guiding means, movable abutment means normally projecting into the path of movement of the slidable panel for retaining the latter in closed position, said abutment means being supported by and depending from said escutcheon, said abutment means being manually movable to a position out of the path of movement of the slidable panel whereby the latter may be moved to full, open or intermediate positions, said abutment means engaging a surface of the slidable panel when the latter is moved from closed position.

References Cited in the file of this patent

UNITED STATES PATENTS

| Number | Name | Date |
|---|---|---|
| 90,092 | Gould | May 18, 1869 |
| 866,073 | Saunders | Sept. 17, 1907 |
| 1,451,026 | Nelson | Apr. 10, 1923 |
| 1,636,008 | Miles | July 19, 1927 |
| 2,192,519 | King | Mar. 5, 1940 |
| 2,274,730 | Owen | Mar. 3, 1942 |
| 2,494,161 | Blackman | Jan. 10, 1950 |

FOREIGN PATENTS

| Number | Country | Date |
|---|---|---|
| 163,872 | Great Britain | 1920 |
| 29,858 | France | 1925 |
| 482,541 | Great Britain | 1937 |
| 525,916 | Great Britain | 1940 |
| 568,824 | Great Britain | 1945 |
| 580,618 | Great Britain | 1946 |
| 623,957 | Great Britain | 1946 |